2,975,201
Patented Mar. 14, 1961

2,975,201

TRANSALCOHOLYSIS OF ALUMINUM ALKOXIDES

Frank H. Dickey, Long Beach, Calif., and Donald R. Napier and Warren W. Woods, Ponca City, Okla., assignors to Continental Oil Company, Ponca City, Okla., a corporation of Delaware No Drawing. Filed May 13, 1959, Ser. No. 812,800

22 Claims. (Cl. 260—448)

The present invention relates to the transalcoholysis of high-molecular-weight aluminum alkoxides and more particularly to such a process whereby high-molecular-weight alcohols and useful aluminum organic compounds may be produced.

Methods for the production of high-molecular-weight aluminum alkoxides from low-molecular-weight aluminum trialkyl compounds, such as triethylaluminum, are known to those skilled in the art and for that reason will not be described here.

It is known that these high-molecular-weight aluminum alkoxides may be converted to the corresponding alcohol by hydrolysis. However, this method has the disadvantage that aluminum hydroxide, which has comparatively little value, is produced as a by-product.

Another method for converting aluminum alkoxides to the corresponding alcohol is that disclosed in U.S. Patent No. 2,469,041, issued May 3, 1949, to Norman Lindsay Jones. In this method the aluminum alkoxide is reacted with a fatty acid to give the corresponding alcohol and the aluminum salt of the fatty acid. Obviously, this method is desirable only if a desired final product is an aluminum salt of a fatty acid.

A possible method for converting aluminum alkoxides to the corresponding alcohol is transalcoholysis. As is well known, such a reaction produces an equilibrium mixture. In order to drive the reaction to completion, one of the "products" must be removed, either by distillation or precipitation. It is known to react an aluminum alkoxide of a lower boiling alcohol with a higher boiling alcohol to give the aluminum alkoxide of the higher boiling alcohol and the free lower boiling alcohol. The reaction in this instance is driven to completion by removing the low boiling alcohol by distillation. Such a method is disclosed in British Patent No. 767,601, issued February 6, 1957. It is readily apparent, however, that, in converting high-molecular-weight aluminum alkoxides to the corresponding alcohol by transalcoholysis with a lower molecular weight alcohol, the reaction may not be driven to completion by distillation of one of the products. The alternate of reacting high-molecular-weight aluminum alkoxides with methanol to form a precipitate does have the effect of pushing the reaction to completion. Unfortunately, it is well known that methanolysis of an aluminum alkoxide, as accomplished by the procedure commonly employed for transalcoholysis, produces a precipitate in a finely divided and gelatinous state, which, for practical purposes, is unfilterable.

It is, therefore, a principal object of the present invention to provide a process whereby high-molecular-weight aluminum alkoxides may be subjected to a methanolysis reaction, which method obviates the disadvantages of the prior art processes. It is another object of the present invention to provide a process whereby the aluminum alkoxide compounds may be converted to the corresponding alcohols in high yields. It is still another object of the present invention to provide a process whereby the precipitate resulting from methanolysis may be readily removed from the system by filtration. These and other objects and advantages of the invention will be apparent from the description which follows.

In brief, we have discovered a process whereby high-molecular-weight aluminum alkoxides may be subjected to a transalcoholysis reaction wherein the aluminum alkoxide is reacted with methyl alcohol in the presence of a solvent in which the resulting high-molecular-weight alcohol is soluble and the resulting aluminum organic compound is insoluble. Following the transalcoholysis reaction, the insoluble materials are removed by filtration, after which the high-molecular-weight alcohol may be recovered by conventional methods.

Before proceeding to specific examples which illustrate our invention, it might be better first to define the materials used and the more important operating conditions of our invention.

The term "high-molecular-weight aluminum alkoxides" refers to the following:

(1) Substantially pure aluminum alkoxides in which the alkoxy group contains from 6 to 40 carbon atoms,
(2) Oxidized "growth" product aluminum alkoxides. In the preparation of these materials, triethylaluminum is reacted with ethylene under carefully controlled conditions to provide aluminum trialkyls of longer chain length. The aluminum trialkyls thus prepared are then oxidized to the corresponding alkoxides. Both of these procedures are adequately described in the literature. By varying the reaction conditions, products may be obtained containing varying carbon chain lengths. The products are mixtures showing a Poisson type distribution of molecular weights. The alkoxy groups of these aluminum alkoxides may contain from 2 to 100 carbon atoms. Preferably, the alkoxy groups contain from 4 to 50 carbon atoms.

In both of the preceding types, the alkoxy groups may be alike or unlike, and the alkyl chains may be either straight or branched. The term "high-molecular-weight" has been chosen as being inclusive of the alkoxides of this invention for reason of brevity.

Methyl alcohol is the preferred material for reacting with the high-molecular-weight aluminum alkoxides. In order to assure a short reaction time, we prefer to use an amount of methyl alcohol which is at least 8 times the theoretical amount required. The theoretical amount only may be used where a longer reaction time can be used.

Generally, a solvent is used for the high-molecular-weight aluminum alkoxide, although this is not always necessary. The primary requisite of the solvent is that it be inert with respect to the alkoxide. Preferred examples of solvents suitable for this purpose include aromatic, paraffinic, and cycloparaffinic hydrocarbons. The amount of solvent is not critical. Usually, we use the minimum amount to assure a homogeneous reaction mixture.

The solvents which may be used to render the aluminum organic compound filterable are acetone and acetonitrile. When these materials are used, the precipitate has a crystalline appearance and is readily filterable. These are the only materials which we have thus far found to be suitable for this purpose. Other materials tried resulted in a gelatinous precipitate which is very difficult, or impossible, to filter. Examples of materials which are not suitable include benzene, isooctane, methylene chloride, methyl ethyl ketone, and diethyl ether. Preferably, this solvent should be substantially anhydrous to preclude the formation of aluminum hydroxide.

We have found that a minimum of 56 moles of acetone or acetonitrile per mole of alkoxide is necessary in order to have a precipitate having fair filterability. In order to have a precipitate having excellent filterability, it is advisable to have 110 moles or more of this solvent per mole of alkoxide. Since it is desirable to keep the recovery of solvents to the minimum amount compatible with good filterability, it is obvious that it is not desirable to use substantially more than 110 moles of solvent per mole of alkoxide.

The reaction is usually conducted at reflux temperature to effect a shorter reaction time. It is to be understood that this is not necessary, only preferable.

The exact nature of the insoluble aluminum organic compound is not known. This is the primary reason for our choice of the term "aluminum organic compound." When using methyl alcohol, our analyses of the insoluble aluminum compound show the aluminum content to be higher than the theoretical amount for aluminum methoxide. Possibly, there is some aluminum hydroxide present, since the work was not done under "closed" conditions. We believe, that when methyl alcohol is used, the product is probably mostly aluminum methoxide or dimers of aluminum methoxide, with some sort of additional complex or aluminum compound present.

It is readily apparent that many uses exist for the products of our invention. The alcohols may be fractionated, after which the lower boiling alcohols may be used as solvents or for other chemical reactions. The alcohols having about 12 carbon atoms may be sulfated and used in detergents. The higher molecular weight alcohols may be used in synthetic waxes.

The insoluble aluminum organic compound, which contains a major proportion of aluminum methoxide and dimers thereof, may be converted to aluminum isobutoxide by a second transalcoholysis. This aluminum isobutoxide may be used to prepare fuel oil additives.

Heretofore, only a few aluminum alkoxides have been available in commercial quantities. Our invention provides an aluminum organic compound which may be easily converted to a wide variety of aluminum alkoxides.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims.

In the examples, the expression "GLPC" refers to gas liquid partition chromatography. This analytical technique is adequately described in either of the following publications: Analyst, 77, 1952, pages 915–932, or Petroleum Refiner, November 1955, pages 165–169.

*Example I*

Twenty grams of aluminum n-octyloxide and 30 milliliters of xylene were placed in a one-liter, three-necked flask equipped with stirrer and reflux condenser. The flask was heated until solution of the aluminum n-octyloxide was complete. Acetone (400 milliliters) was added through the top of the condenser. Methanol (50 milliliters) was then added in the same manner. The mixture was stirred and refluxed for one-half hour, then allowed to cool. After standing for about one hour, a finely divided solid settled out, leaving a clear supernatant liquid. After decanting the liquid, the solid was filtered, washed with acetone, and dried under vacuum at room temperature. The solid material obtained was a white powder. It weighed 4.5 grams and contained 29.3 percent aluminum. This amounted to a 100 percent recovery of the aluminum. Xylene (60 milliliters) was added to the combined liquids which were then distilled to recover acetone and unreacted methanol. The residual liquid (86.4 grams) contained 100 percent of the theoretical amount of n-octanol. GLPC analysis was used to determine the n-octanol.

*Example II*

Twenty grams of aluminum n-octyloxide and 30 milliliters of xylene were placed in a one-liter, three-necked flask equipped with stirrer and reflux condenser. Acetonitrile (400 milliliters) was added through the top of the condenser. When the mixture started to reflux (81° C.), methanol (50 milliliters) was added in the same manner. The mixture was stirred for one-half hour, then allowed to cool. The mixture was then filtered through a sintered glass, medium porosity, filter. The precipitate was washed with acetone. Filtration was thorough and rapid. The white solid product, which had a crystalline appearance, was dried under vacuum (<0.5 millimeter) for 4 hours at room temperature. The product weighed 4.55 grams and contained 27.4 percent aluminum. This amounted to a 96 percent recovery of the aluminum.

*Example III*

In this example, oxidized "growth" product aluminum alkoxides were used. This material consisted of a mixture in which the alkoxy groups contained from 2 to 20 carbon atoms, with the maximum being in the 8 to 12 carbon atom range. A xylene solution of the oxidized "growth" product (500 grams, 3.40 percent Al) containing 30.3 percent by weight of aluminum alkoxides was combined with acetone (6,000 milliliters) and methanol (608 milliliters). The mixture was stirred at reflux temperature for one-half hour. After cooling the solid product was filtered off, washed with acetone, and vacuum dried. The dried product weighed 63.5 grams and contained 26.7 percent aluminum. The recovery of aluminum was 100 percent.

*Example IV*

Example III was repeated, starting with 510 grams of the same oxidized "growth" product. After drying, the precipitate weighed 67.1 grams and contained 25.6 percent aluminum. The recovery of aluminum in this example was 99 percent.

The filtrate was combined with the filtrate of Example III. From the combined weights (266 grams) of the various alcohols obtained, the composite yield was calculated to be 98 percent.

*Example V*

Example III was repeated, using a different oxidized "growth" product aluminum alkoxide. In this particular aluminum alkoxide the alkoxy groups contained from 2 to 50 carbon atoms, with the "peak" being around 32 carbon atoms.

Similar results were obtained.

In summary, we have shown a process for the conversion of high-molecular-weight aluminum alkoxides to the corresponding high-molecular-weight alcohols and aluminum organic compounds of substantial value. Our process provides for substantially complete recovery of both the aluminum and the alkoxy groups.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. In a process for the transalcoholysis of an aluminum alkoxide containing from 2 to 100 carbon atoms in each of the alkoxy groups, the improvement which comprises reacting said aluminum alkoxide with methyl alcohol, wherein the amount of said methyl alcohol is at least equal to the stoichiometric amount, in the presence of at least 56 moles of a solvent per mole of aluminum alkoxide, said solvent being selected from the group consisting of acetone, acetonitrile, and mixtures thereof, to form the corresponding alcohol and aluminum organic compound, removing said aluminum organic compound from the resulting mixture and then recovering the alcohol.

2. The process of claim 1 wherein each of the alkoxy groups of the aluminum alkoxide contains from 2 to 50 carbon atoms.

3. The process of claim 2 wherein the solvent is acetone.

4. The process of claim 2 wherein the solvent is acetonitrile.

5. The process of claim 2 wherein the solvent is a mixture of acetone and acetonitrile.

6. The process of claim 3 wherein the solvent is present in an amount at least equal to 110 moles of solvent per mole of aluminum alkoxide.

7. The process of claim 4 wherein the solvent is present in an amount at least equal to 110 moles of solvent per mole of aluminum alkoxide.

8. The process of claim 5 wherein the solvent is present in an amount at least equal to 110 moles of solvent per mole of aluminum alkoxide.

9. The process of claim 1, wherein each of the alkoxy groups of the aluminum alkoxide contains from 2 to 20 carbon atoms.

10. The process of claim 9 wherein the solvent is acetone.

11. The process of claim 9 wherein the solvent is acetonitrile.

12. The process of claim 9 wherein the solvent is a mixture of acetone and acetonitrile.

13. The process of claim 10 wherein the solvent is present in an amount at least equal to 110 moles of solvent per mole of aluminum alkoxide.

14. The process of claim 11 wherein the solvent is present in an amount at least equal to 110 moles of solvent per mole of aluminum alkoxide.

15. The process of claim 12 wherein the solvent is present in an amount at least equal to 110 moles of solvent per mole of aluminum alkoxide.

16. In a process for the transalcoholysis of an aluminum alkoxide, containing from 2 to 100 carbon atoms in each of the alkoxy groups, the improvement which comprises reacting said aluminum alkoxide with methyl alcohol, wherein the amount of said methyl alcohol is at least equal to 8 times the theoretical amount, in the presence of at least 56 moles of a solvent per mole of aluminum alkoxide, said solvent being selected from the group consisting of acetone, acetonitrile, and mixtures thereof, to form the corresponding alcohol and aluminum organic compound, removing said aluminum organic compound from the resulting mixture and then recovering the alcohol.

17. The process of claim 16 wherein each of the alkoxy groups of the aluminum alkoxide contains from 2 to 50 carbon atoms.

18. The process of claim 16 wherein each of the alkoxy groups of the aluminum alkoxide contains from 2 to 20 carbon atoms.

19. The process of claim 17 wherein the solvent is present in an amount at least equal to 110 moles of solvent per mole of aluminum alkoxide.

20. The process of claim 18 wherein the solvent is present in an amount at least equal to 110 moles of solvent per mole of aluminum alkoxide.

21. The process of claim 19 wherein the solvent is acetone.

22. The process of claim 20 wherein the solvent is acetone.

No references cited.